(12) United States Patent
Lin

(10) Patent No.: US 12,038,647 B2
(45) Date of Patent: Jul. 16, 2024

(54) BACKLIGHT MODULE AND DISPLAY DEVICE

(71) Applicants: K-Tronics (Suzhou) Technology Co., Ltd., Jiangsu (CN); BOE Technology Group Co., Ltd., Beijing (CN)

(72) Inventor: Jingfei Lin, Beijing (CN)

(73) Assignees: K-Tronics (Suzhou) Technology Co., Ltd., Jiangsu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/036,861

(22) PCT Filed: Nov. 17, 2020

(86) PCT No.: PCT/CN2020/129498
§ 371 (c)(1),
(2) Date: May 12, 2023

(87) PCT Pub. No.: WO2022/104554
PCT Pub. Date: May 27, 2022

(65) Prior Publication Data
US 2023/0408868 A1    Dec. 21, 2023

(51) Int. Cl.
*G02F 1/13357* (2006.01)
*F21V 8/00* (2006.01)
(Continued)

(52) U.S. Cl.
CPC ....... *G02F 1/133615* (2013.01); *G02B 5/003* (2013.01); *G02B 5/206* (2013.01);
(Continued)

(58) Field of Classification Search
CPC ......... G02F 1/133605; G02F 1/133615; G02B 6/0031; G02B 6/0055
See application file for complete search history.

(56) References Cited

U.S. PATENT DOCUMENTS

2011/0298696 A1  12/2011  Gu et al.
2016/0161661 A1  6/2016  Cho et al.

FOREIGN PATENT DOCUMENTS

CN    103592705 A    2/2014
CN    204477936 U  *  7/2015
(Continued)

OTHER PUBLICATIONS

CN202080002812.3 first office action.
CN202080002812.3 second office action.
PCT/CN2020/129498 international search report.

*Primary Examiner* — Mariceli Santiago
(74) *Attorney, Agent, or Firm* — IPro, PLLC

(57) ABSTRACT

A backlight module and a display. The backlight module includes: a light guide plate, the light guide plate including: a bottom surface and a light emission surface which are arranged opposite to each other, and a light incident surface connecting the bottom surface and the light emission surface; an edge-type light source, the edge-type light source being located on the light incident surface side of the light guide plate, a quantum dot film, located on the light emission surface of the light guide plate; and a reflection film, located on the bottom surface side of the light guide plate, the reflection film including a body and a yellow film located around the body, and the yellow film being configured to absorb blue light refracted from the light guide plate to the periphery of the reflection film.

8 Claims, 3 Drawing Sheets

(51) Int. Cl.
*G02B 5/00* (2006.01)
*G02B 5/20* (2006.01)
*G02F 1/1333* (2006.01)

(52) U.S. Cl.
CPC ..... *G02B 6/0055* (2013.01); *G02F 1/133308* (2013.01); *G02B 2207/101* (2013.01)

(56) References Cited

FOREIGN PATENT DOCUMENTS

| | | | | |
|---|---|---|---|---|
| CN | 105068315 | A | | 11/2015 |
| CN | 105402640 | A | | 3/2016 |
| CN | 105676522 | A | | 6/2016 |
| CN | 206248967 | U | | 6/2017 |
| CN | 107327747 | A | * | 11/2017 |
| CN | 107327747 | A | | 11/2017 |
| CN | 107477436 | A | | 12/2017 |
| CN | 107728381 | A | | 2/2018 |
| CN | 108775541 | A | * | 11/2018 ............ F21S 10/023 |
| KR | 20130006204 | A | * | 1/2013 |

* cited by examiner

BACKLIGHT MODULE AND DISPLAY DEVICE

CROSS-REFERENCE TO RELATED APPLICATION

This application is a national phase entry under 35 U.S.C § 371 of International Application No. PCT/CN2020/129498, filed Nov. 17, 2020, and entitled "BACKLIGHT MODULE AND DISPLAY DEVICE".

FIELD

The present disclosure relates to a reflection film, in particular to a backlight module and a display device.

BACKGROUND

The liquid crystal display (LCD) is widely used in televisions, computers, mobile phones and other electronic products due to its many advantages such as thin body, power saving, and no radiation, etc. LCD display device is passive light-emitting display, where the display screen itself does not emit any light, and is illuminated by the backlight module behind the display screen.

With the transformation of people's consumption concepts, consumers are more pursuing lightweight and beautiful LCD displays. Traditional backlight modules may be divided into a direct type backlight module and an edge-lit backlight module according to different light-emitting modes of the backlight module. Compare with the direct type backlight module, the edge-lit backlight module is more lightweight and fashionable, in line with modern fashion pursuits.

SUMMARY

Embodiments of the present disclosure provide a backlight module, including:
  a light guide plate, including a bottom surface and a light emitting surface arranged opposite to each other, and a light incident surface connecting the light emitting surface with the bottom surface;
  an edge-lit light source, located at a side of the light incident surface of the light guide plate;
  a quantum dot film, located on the light emitting surface of the light guide plate;
  a reflection film, located at a side of the bottom surface of the light guide plate; the reflection film includes a main body and a yellow film arranged around the main body, the yellow film is configured to absorb blue light refracted from the light guide plate to a periphery of the reflection film.

Optionally, in the above backlight module provided by the embodiments of the present disclosure, the yellow film includes a plurality of yellow colored blocks printed around the main body.

Optionally, in the above backlight module provided by the embodiments of the present disclosure, an total area of the plurality of yellow colored blocks accounts for 5%-80% of an area of the main body.

Optionally, in the above backlight module provided by the embodiments of the present disclosure, along a direction of an edge region of the reflection film pointing to a central region of the reflection film, an area of the yellow colored blocks per unit area tends to decrease.

Optionally, in the above backlight module provided by the embodiments of the present disclosure, along the direction of the edge region of the reflection film pointing to the central region of the reflection film, a distribution density of the plurality of yellow colored blocks is the same, and diameters of the plurality yellow colored blocks are decreasing.

Optionally, in the above backlight module provided by the embodiments of the present disclosure, the diameters of the plurality of yellow colored blocks are 0.2 mm-3 mm.

Optionally, in the above backlight module provided by the embodiments of the present disclosure, a wavelength of light reflected by the yellow film is 577 nm-597 nm.

Optionally, in the above backlight module provided by the embodiments of the present disclosure the yellow film includes a first region adjacent to the edge-lit light source: a second region arranged opposite to the edge-lit light source: and a third region and a fourth region arranged to connect the first region and the second region:
  a width of the first region is 0-50 mm, a width of the second region is 0-30 mm, and widths of the third region and the fourth region are 0-20 mm.

Optionally, in the above backlight module provided by the embodiments of the present disclosure, further including a back panel, located at a side of the reflection film facing away from the light guide plate: and an optical film, located at a side of the quantum dot film facing away from the light guide plate.

Optionally, in the above backlight module provided by the embodiments of the present disclosure, a light emitting surface of the edge-lit light source is parallel to the light incident surface of the light guide plate, and the edge-lit light source is a blue LED lamp bar.

Accordingly, the embodiments of the present disclosure provide a display device, including the above backlight module and a liquid crystal display panel located on a light emitting surface of the backlight module.

Optionally, in the above display device provided by the embodiments of the present disclosure, further including a support frame, arranged to surround the liquid crystal display panel, and for fixing the liquid crystal display panel and the backlight module: the liquid crystal display panel and the backlight module are embedded in the support frame.

DETAILED DESCRIPTION OF THE EMBODIMENTS

Figure 1:
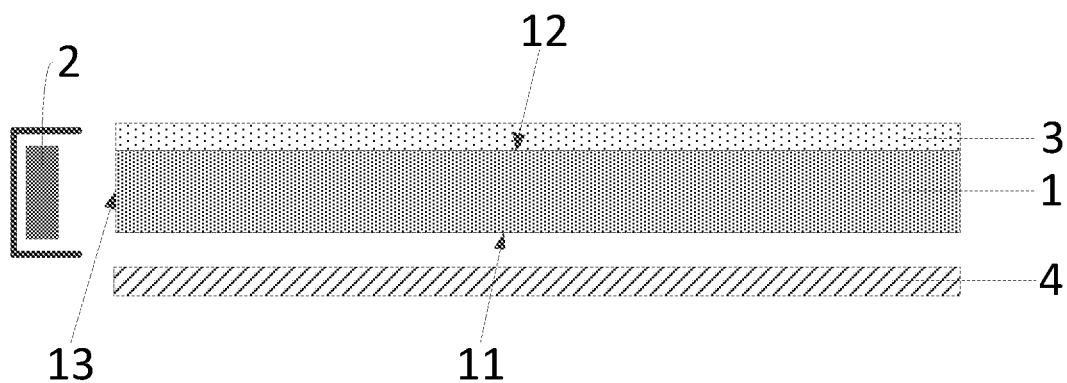
FIG. 1 is a schematic structural diagram of a backlight module provided by an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. Apparently, the described embodiments are merely some embodiments rather than all embodiments of the present disclosure. And without conflict, the embodiments and features in the embodiments disclosed in the present disclosure can be combined with each other. Based on the embodiments of the present disclosure, all other embodiments obtained by those of ordinary skill in the art without making creative efforts fall within the scope of protection of the present disclosure.

Unless otherwise defined, technical or scientific terms used herein shall have the ordinary meanings understood by those ordinarily skilled in the art to which the present disclosure pertains. The words "comprise" or "include" and the like indicate that an element or item appearing before such the words covers listed elements or items appearing after the words and equivalents thereof, and do not exclude other elements or items. The word "connect" or "link" and the like are not limited to physical or mechanical connection, but may include electrical connection, whether direct or indirect. "Inner", "outer", "upper", "lower" and the like are only used to represent relative position relationships, and the relative position relationships may also change accordingly after an absolute position of a described object is changed.

It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions all the time.

Quantum dot backlight module is a module that adds a quantum dot film to an ordinary backlight module. The current common edge-lit quantum dot backlight module is composed of a reflection film, an edge-lit light source, a light guide plate, a quantum dot film and an optical film. The edge-lit light source of the edge-lit quantum dot backlight module emits blue light, which is guided by the light guide plate to form a surface light source. The blue light excites the quantum dots in the quantum film and is converted into white light. Since the edge-lit light source is adjacent to a light incident surface of the light guide plate, the blue light at the light incident surface of light guide plate is relatively strong, and in addition to the light incident surface, the bottom surface and the light emitting surface, the other three sides of the light guide plate are generally attached with reflective strips to reflect the blue light refracted from the light guide plate back to the light guide plate, so the blue light at the three sides is also strong, thereby resulting in a large amount of light emitting from the edges of the light guide plate. The quantum dots in the quantum dot film are evenly distributed, so there is part of blue light at the edges of the light guide plate that is not excited into white light by the quantum dots. Therefore, the part of the blue light penetrates out, resulting in the appearance of blue on the edges of the liquid crystal display screen.

Figure 2:
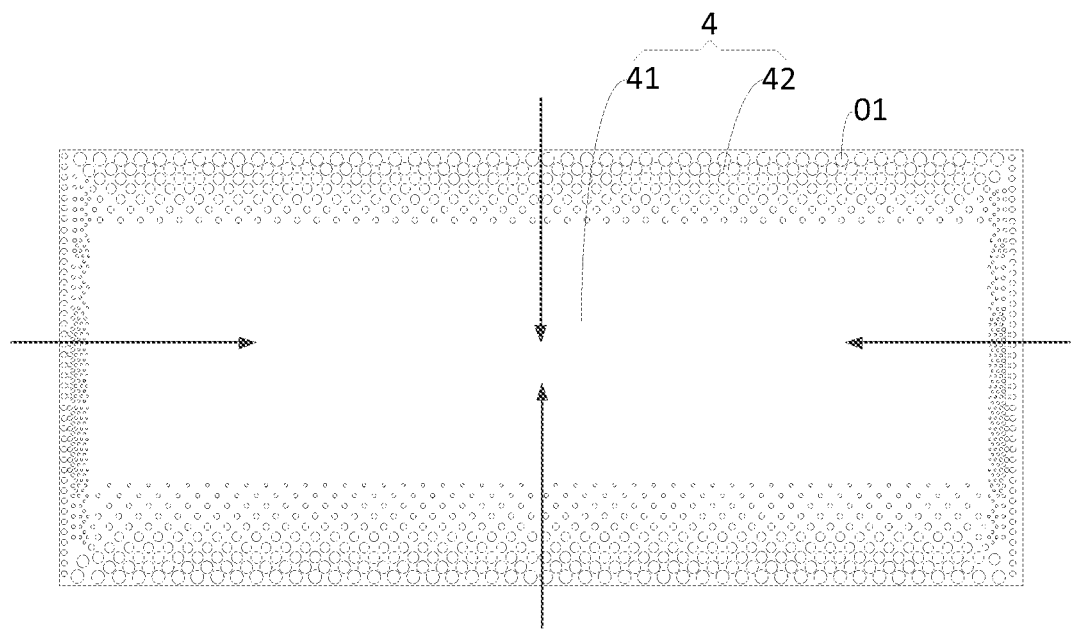
FIG. 2 is a top view schematic structural diagram of a backlight module provided by an embodiment of the present disclosure.

In order to solve the problem that blue coloring on the edges of the liquid crystal display screen caused by the large amount of light emitted from the edges of the edge-lit backlight module, the present disclosed embodiment provides a backlight module, as shown in FIG. 1, including:

a light guide plate 1, the light guide plate 1 includes: a bottom surface 11 and a light emitting surface 12 arranged opposite to each other, a light incident surface 13 connecting the light emitting surface 12 with the bottom surface 11;

an edge-lit light source 2, the edge-lit light source 2 is located at a side of the light incident surface 13 of the light guide plate 1;

a quantum dot film 3, located on the light emitting surface 12 of the light guide plate 1;

a reflection film 4 is located at a side of the bottom surface 11 of the light guide plate 1, as shown in FIG. 2, the reflection film 4 includes a main body 41 and a yellow film 42 arranged around the main body 41, the yellow film 42 is configured to absorb blue light refracted from the light guide plate 1 to a periphery of the reflection film 4.

The above backlight module provided by the embodiments of the present disclosure, the blue light emitted by the edge-lit light source 2 enters the light guide plate 1; a portion of the blue light entering the light guide plate 1 is emitted from the light emitting surface of the light guide plate 1 and is used for excitation with the quantum dot of the quantum dot film 3 in the backlight module to generate white light: another portion of the blue light will be refracted to the reflection film 4 through the light guide plate 1, and part of the another portion of the blue light is in the periphery of the reflection film 4, and is absorbed by the yellow film 42 arranged around the main body 41, thereby reducing the amount of light emitting from the edges of the light guide plate 1 to achieve the purpose of avoiding the periphery of a display screen appears bluish and make the color uniform. The reflection film 4 in the backlight module provided by the embodiments of the present disclosure solves the problem that blue coloring on the edges of the liquid crystal display screen caused by the large amount of light emitted from the edges of the edge-lit backlight module, and the reflection film 4 has a simple structure, convenient processing, and low cost, which enhances the competitiveness of the product and the quality of the display image.

Optionally, in the backlight module provided by the embodiments of the present disclosure, the material of the yellow film is yellow pigment ink. Specifically, the yellow pigment ink is obtained by modulating the yellow pigment and the white ink, in which the yellow pigment itself does not emit light, but the yellow pigment may absorb blue light. Through the modulation of the yellow pigment and the white ink, a modulation ink with a suitable shade of yellow is obtained, and a corresponding yellow film is obtained by printing.

Optionally, in the above backlight module provided by the embodiments of present disclosure, a wavelength of light reflected by the yellow film is 577 nm-597 nm.

Optionally, in the above backlight module provided by the embodiments of the present disclosure the mass of the yellow pigment accounts for 5%-20% of the total mass of the yellow pigment ink. Specifically, the total mass of the yellow pigment ink is the sum of the mass of the yellow pigment and the mass of the white ink as mentioned above. The inventor of the present disclosure found that if the mass of the yellow pigment accounts for less than 5% of the total mass of the yellow pigment ink, the excess blue light at the edges of the backlight module will not be completely absorbed: if the mass of the yellow pigment accounts for more than 20% of the total mass of the yellow pigment ink, not only the excess blue light at the edges of the backlight module will be absorbed, but the yellow film may also absorb part of the blue light that excites the quantum dots at the edges, thereby affecting the display effect. So the inventor of the present disclosure set the mass of the yellow pigment to account for 5%-20% of the total mass of the yellow pigment ink.

Optionally, in the above backlight module provided by the embodiments of the present disclosure, as shown in FIG. 2, the yellow film 42 includes a plurality of yellow colored blocks 01, which is printed around the main body 41. The plurality of yellow colored blocks 01 are formed by printing the yellow pigment ink modulated above to the edges of the main body 41 of the reflection film 4. The plurality of yellow colored blocks 01 is printed on the reflection film 4, which is simple to operate and less costly.

Specifically, as shown in FIG. 2, the shape of the yellow colored blocks 01 may be round, of course, it may be other shapes.

Optionally, in the above backlight module provided by the embodiments of the present disclosure as shown in FIG. 2, an total area of the plurality of yellow colored blocks 01 accounts for 5%-80% of an area of the main body 41, when the excess blue light around the reflection film 4 is strong, a larger area of yellow colored blocks 01 may be selected, and when the excess blue light around the reflection film 4 is weak, a smaller area of yellow colored blocks 01 may be selected. Therefore, the yellow colored blocks may be selected according to the intensity of the excess blue light around the reflection film 4, this is not limited.

During specific implementation, as shown in FIG. 1, since the edge-lit light source 2 is adjacent to the light incident surface 13 of the light guide plate 1, the blue light at the light incident surface 13 of the light guide plate 1 is fairly strong, and the other three sides of the light guide plate 1 except the light incident surface 13, the bottom surface 11 and the light emitting surface 12 are generally attached with reflection strips, so the blue light at the three sides is also strong. Since the light travels in a straight line, the intensity of blue light tends to weaken from the light incident surface 13 to the central region of the light guide plate 1, and the intensity of blue light, from the remaining three sides other than the light incident surface 13, the bottom surface 11 and the light emitting surface 12 to the central region of the light guide plate 1, also tends to weaken, so that the blue light refracted from the periphery of the light guide plate 1 to the reflection film 4 is directed from the edges of the reflection film 4 to the central region, and the blue light on the reflection film 4 also tends weaken. Therefore, the excess blue light from the edges of the reflection film 4 to the central region is also weakening.

Thus, in the above reflection film provided by the embodiments of the present disclosure as shown in FIG. 2, along a direction of an edge region of the reflection film 4 pointing to the central region of the reflection film 4 (arrow pointing), the total area of the yellow colored blocks 01 per unit area tends to decrease. The excess blue light at the edge region may be effectively absorbed without absorbing the blue light which is used to excite the quantum dots, thereby improving the display effect.

Optionally, in the above backlight module provided by the embodiments of the present disclosure, as shown in FIG. 2, along the direction of the edge region of the reflection film 4 pointing to the central region of the reflection film 4 (arrow pointing), diameters of the plurality of yellow colored blocks 01 tends to decrease. Specifically, along the direction of the edge region of the reflection film 4 to the central region of the reflection film 4 (arrow pointing), the distribution density of the yellow colored blocks 01 may be the same, but the diameters of the yellow colored blocks 01 tends to decrease: or it can also be that the distribution density and the diameter of the yellow colored blocks 01 both tend to decrease, this can be designed according to actual needs.

Of course, the total area of the yellow colored blocks per unit area mentioned above shows a decreasing trend may also be that in the direction of the edge region of the reflection film pointing to the central region of the reflection film, the sizes of all yellow colored blocks are the same, but the distribution density of the yellow colored blocks tends to decrease: or the sizes and the distribution density of the yellow colored blocks both tend to decrease. The FIG. 2 of the embodiments of the present disclosure is illustrated by an example that the distribution density of the yellow colored blocks are the same, and the size of the yellow colored blocks are decreasing.

Optionally, in the above reflection film provided by the embodiments of the present disclosure, as shown in FIG. 2, the diameters of the yellow colored blocks 01 may be 0.2 mm-3 mm. Specifically, the yellow colored blocks 01 near the edge region of the reflection film may have a larger diameter, and the yellow colored blocks 01 near the central region of the reflection film may have a smaller diameter.

Figure 3:
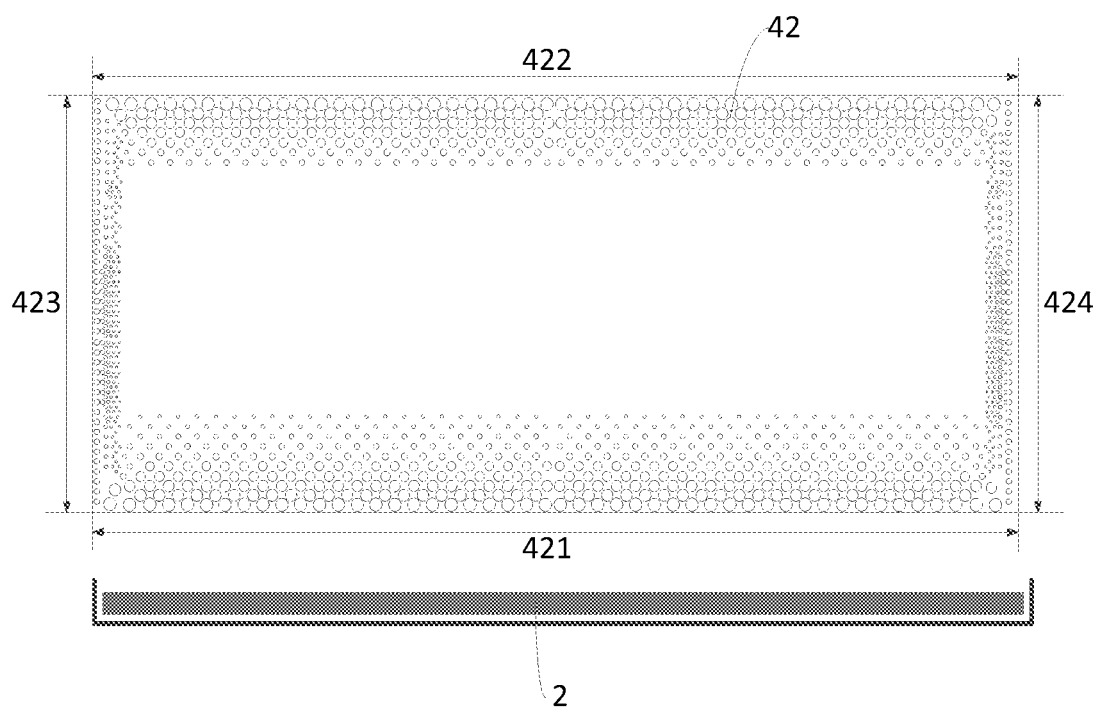
FIG. 3 is a top view schematic structural diagram of a reflection film and an edge-lit light source provided by an embodiment of the present disclosure.

During specific implementation, as shown in FIG. 1, since light incident surface 13 of the light guide plate 1 is directly adjacent to the edge-lit light source 2, so blue light at the light incident surface 13 of the light guide plate 1 is the strongest. Due to the light travels in a straight line, the blue light at an opposite surface of the light incident surface 13 of the light guide plate is also fairly strong, while the intensity of the blue light corresponding to the remaining two sides in the light guide plate 1 other than the light incident surface 13, the bottom surface 11, the light emitting surface 12 and the opposite surface of the light incident surface 13 is relatively weak. Thus, in the above backlight module provided by the embodiments of the present disclosure, as shown in FIG. 3. FIG. 3 is a top view schematic structural diagram of the reflection film 4 and the edge-lit light source 2, the yellow film 42 includes: a first region 421 adjacent to the edge-lit light source 2 of the backlight module: a second region 422 arranged opposite to the edge-lit light source 2 of the backlight module: and a third region 423 and a fourth region 424 arranged to connect the first region 421 and the second region 422. Along a direction of an edge region of the yellow film 42 pointing to the central region, a width of the first region 121 is 0-50 mm, a width of the second region 422 is 0-30 mm, and widths of the third region 423 and the fourth region 424 are both 0-20 mm. In this way, the yellow film 42 can absorb the excess blue light at the edge region more effectively.

Figure 4:
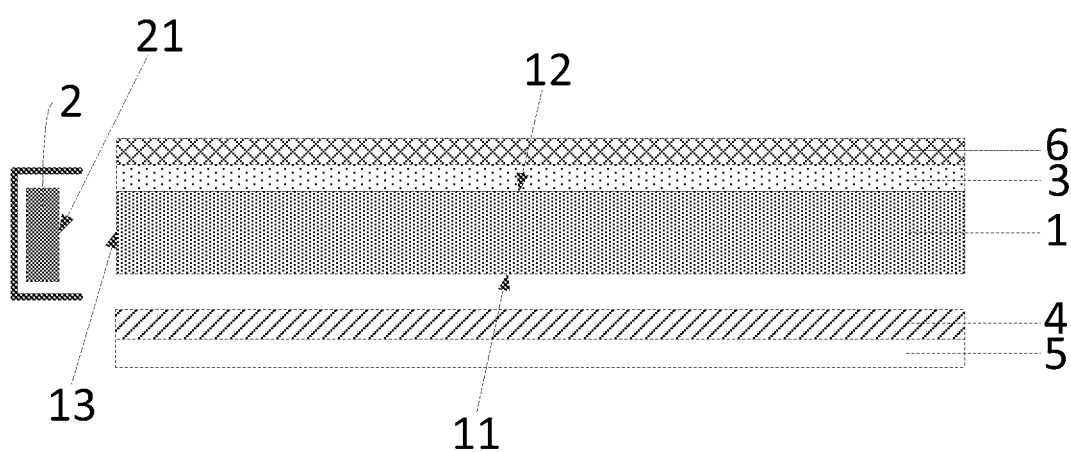
FIG. 4 is a schematic structural diagram of another backlight module provided by an embodiment of the present disclosure.

Optionally, in the above backlight module provided by the embodiments of the present disclosure, as shown in FIG. 4, also includes: a back panel 5, located at a side of the reflection film 4 facing away from the light guide plate 1, and an optical film 6 located at a side of the quantum dot film 3 facing away from the light guide plate 1. Specifically. FIG. 4 is only a schematic structural diagram of the partial cross-sectional of the backlight module, the specific structure of each component is the same as the prior art, and the difference between the FIG. 4 and the prior art is that the yellow film described above is provided on the reflection film 4: the optical film 6 may include a prism sheet, brightness enhancing sheet and other structures.

Optionally, in the above backlight module provided by the embodiments of the present disclosure, as shown in FIG. 4, a light emitting surface 21 of the edge-lit light source 2 is parallel to the light incident surface 13 of the light guide plate 1, and the edge-lit light source 2 may be a blue LED lamp bar.

Specifically, the LED lamp bar may include a lamp bar substrate and a plurality of blue LED lamp beads which are arranged on the light strip substrate and arranged at intervals. The plurality of blue LED lamp beads are sequentially spaced along the extension direction of the lamp bar substrate.

Figure 5:
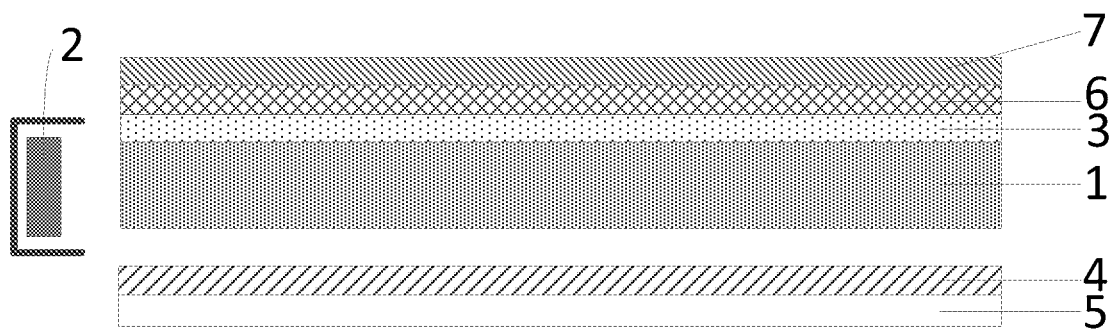
FIG. 5 is a schematic structural diagram of a display device provided by an embodiment of the present disclosure.

Based on the same disclosure concept, the embodiments of the present disclosure further provide a display device. As shown in FIG. 5, the display device includes the above backlight module and a liquid crystal display panel 7 located on a light emitting surface of the backlight module.

Figure 6:
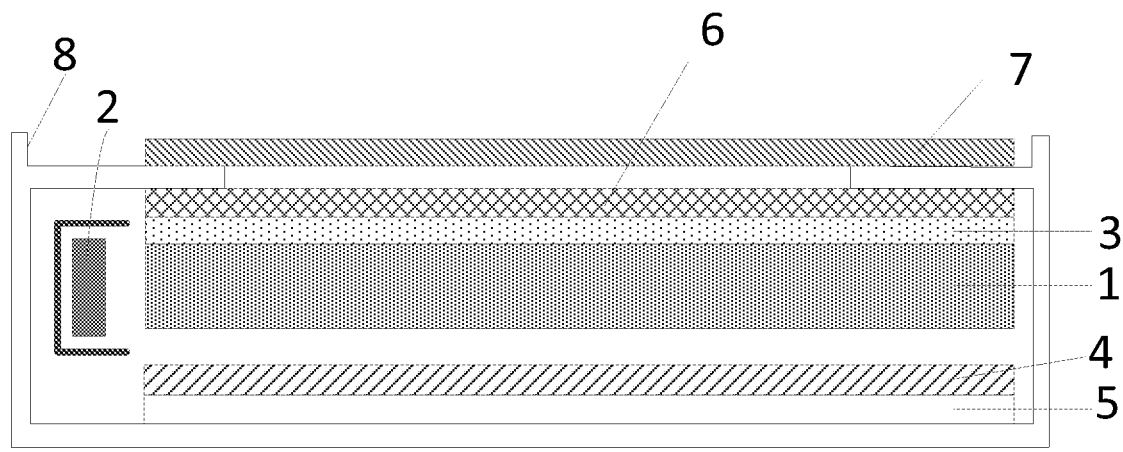
FIG. 6 is another schematic structural diagram of a display device provided by an embodiment of the present disclosure.

Optionally, as shown in FIG. 6, the above display device provided in the embodiments of the present disclosure further includes a support frame 8, arranged to surround the liquid crystal display panel and for fixing the liquid crystal display panel and the backlight module, and the liquid crystal display panel and the backlight module are embedded in the support frame 8.

Specifically, the support frame 8 may be made of plastic or metal (e.g., stainless steel).

Specifically, the display device may be any product or component with a display function, such as a mobile phone, a tablet computer, a television, a display, a notebook computer, a digital photo frame, a navigator, a smart watch, a fitness wristband, and a personal digital assistant. Other essential components of the display device should all be understood by those of ordinary skill in the art, and are not repeated herein, nor are they intended to limit the present disclosure. In addition, since the principle for solving problems of the display device is similar to that of the above backlight module, implementation of the display device may refer to implementation of the above backlight module, the repetitions of which will not be repeated herein.

In the backlight module and the display device above according to the embodiments of the present disclosure, the blue light emitted by the edge-lit light source enters the light guide plate: a part of the blue light entering the light guide plate is refracted to the light emitting surface of the light guide plate, and excited by the quantum dots of the quantum dot film in the backlight module to present the white light phenomenon: another part of the blue light entering the light guide plate is refracted to the reflection film by the light guide plate, where the blue light at the edge around the reflection film is absorbed by the yellow film arranged around the main body, thereby reducing the amount of light emitted from the edges the light guide plate and achieving uniform display color. The reflection film in the backlight module provided in the embodiments of the present disclosure solves the problem of blue coloring on the edges of the liquid crystal display screen caused by the large amount of light emitted from the edges of the edge-lit backlight module, and the reflection film has a simple structure, convenient processing, and low cost, which enhances the competitiveness of the product and the taste of the display image.

Although preferred embodiments have been described in the present disclosure, additional changes and modifications to these embodiments may be made by those skilled in the art once the underlying inventive concepts are known. Therefore, the attached claims are intended to be interpreted as including preferred embodiments and all changes and modifications falling within the scope of this disclosure.

Apparently, those skilled in the art can make various modifications and variations to the embodiments of the present disclosure without departing from the spirit and scope of the present disclosure. In this way, if the modifications and variations of the present disclosure fall within the scope of claims of the present disclosure and their equivalents, the present disclosure is also intended to encompass these modifications and variations.

What is claimed is:

1. A backlight module, comprising:
   a light guide plate, comprising a bottom surface and a light emitting surface arranged opposite to each other, and a light incident surface connecting the light emitting surface with the bottom surface;
   an edge-lit light source, located at a side of the light incident surface of the light guide plate;
   a quantum dot film, located on the light emitting surface of the light guide plate;
   a reflection film, located at a side of the bottom surface of the light guide plate, wherein the reflection film comprises a main body and a yellow film arranged around the main body, the yellow film is configured to absorb blue light refracted from the light guide plate to a periphery of the reflection film;
   wherein the yellow film comprises a plurality of yellow colored blocks printed around the main body, and diameters of the plurality of yellow colored blocks are 0.2 mm-3 mm;
   wherein a wavelength of light reflected by the yellow film is 577 nm-597 nm; and
   wherein the yellow film comprises: a first region, adjacent to the edge-lit light source; a second region, arranged opposite to the edge-lit light source; and a third region and a fourth region, arranged to connect the first region and the second region; wherein a width of the first region is 0-50 mm, a width of the second region is 0-30 mm, and widths of the third region and the fourth region are 0-20 mm.

2. The backlight module according to claim 1, wherein an total area of the plurality of yellow colored blocks accounts for 5%-80% of an area of the main body.

3. The backlight module according to claim 2, wherein along a direction of an edge region of the reflection film pointing to a central region of the reflection film, an area of the yellow colored blocks per unit area tends to decrease.

4. The backlight module according to claim 3, wherein along the direction of the edge region of the reflection film pointing to the central region of the reflection film, a distribution density of the plurality of yellow colored blocks is the same, and the diameters of the plurality yellow colored blocks are decreasing.

5. The backlight module according to claim 1, further comprising:
   a back panel, located at a side of the reflection film facing away from the light guide plate; and
   an optical film, located at a side of the quantum dot film facing away from the light guide plate.

6. The backlight module according to claim 1, wherein a light emitting surface of the edge-lit light source is parallel to the light incident surface of the light guide plate, and the edge-lit light source is a blue light emitting diode, LED, or lamp bar.

7. A display device, comprising the backlight module according to claim 1, and a liquid crystal display panel located on a light emitting surface of the backlight module.

8. The display device according to claim 7, further comprising:
   a support frame, arranged to surround the liquid crystal display panel, and for fixing the liquid crystal display panel and the backlight module,
   wherein the liquid crystal display panel and the backlight module are embedded in the support frame.

* * * * *